United States Patent [19]

Barrowcliff

[11] 4,058,302

[45] Nov. 15, 1977

[54] BENCH HOLDER FOR A CLOCK

[76] Inventor: Robert F. Barrowcliff, 3262 Rustic Drive, Santa Clara, Calif. 95051

[21] Appl. No.: 686,710

[22] Filed: May 17, 1976

[51] Int. Cl.$^2$ .............................................. B23Q 1/04

[52] U.S. Cl. ........................................ 269/76; 269/97; 269/250

[58] Field of Search ........................ 269/97, 69, 74, 76, 269/81, 95, 97, 250; 81/6

[56] References Cited

U.S. PATENT DOCUMENTS

| | | | |
|---|---|---|---|
| 432,829 | 7/1890 | Hirst | 269/97 |
| 2,571,189 | 10/1951 | Bersche | 81/6 |
| 2,586,636 | 2/1952 | Fischer et al. | 269/97 |
| 3,057,617 | 10/1962 | Sealander | 269/69 |

*Primary Examiner*—Robert C. Watson

[57] ABSTRACT

A bench holder for a clock mechanism under repair. The holder comprises a pair of parallel-disposed, clock-mechanism, platelike holding jaws. A jaw support rod is rigidly fixed to one jaw and projects therefrom. A pair of manual adjusting screws adjustably supports the second jaw on the first jaw for a parallel opening and closing movement of the jaws. A first bench top support stand has an elongated shaft formed at one end with a first socket receiving hole. A clamping collar is adjustably fixed to the end of the shaft having the first socket hole. The collar and the shaft are each formed with aligned holes on an axis normal to the longitudinal axis of the first socket hole. The jaws may be optionally inserted into either the first socket hole in the shaft or in the aligned socket holes and rotated within each of the socket holes to effect a desired attitude of the clock mechanism. In the first bench top support stand, the shaft is telescopically received by a tube supported on a base. In a second bench side support stand, a C-clamp is modified by welding a collar carrying an adjusting screw to an upper arm of the clamp. The welded collar is formed with a central socket hole which is sized to engage fixedly the shaft when the shaft is manually inserted within the collar. The tightening of the welded collar screw enables the bench side holder to support the jaws at the side of a bench.

5 Claims, 5 Drawing Figures

BENCH HOLDER FOR A CLOCK

BACKGROUND OF THE INVENTION

A search of the prior art discloses a variety of holders specifically designed for supporting clock mechanisms. Typical timepiece holder patents are U.S. Pat. Nos. 1,045,227 and 1,476,211.

These structures do not provide all the necessary clock holding attitudes that a repair technician might find desirable.

Accordingly, a principle object of the invention is to provide a bench holder for a clock under repair which holder may be positioned at either the top or side of a bench and which is adjustable as to height, provides vertical or horizontal positioning of clock holding jaws with complete 360° rotation of the jaws, provides adjustment of the jaws opening, and in which the jaws may be easily removed from the stand.

A brief description of the structure of this invention which attains the foregoing object is found in the Abstract, and a detailed description appears hereafter.

DETAILED DESCRIPTION OF THE DRAWINGS

DETAILED DESCRIPTION OF THE PREFERRED EMBODIMENT

Figure 4:
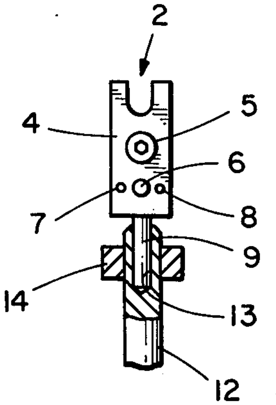
FIG. 4 is a fragmentary view showing the holding jaws in a second position.
Figure 5:
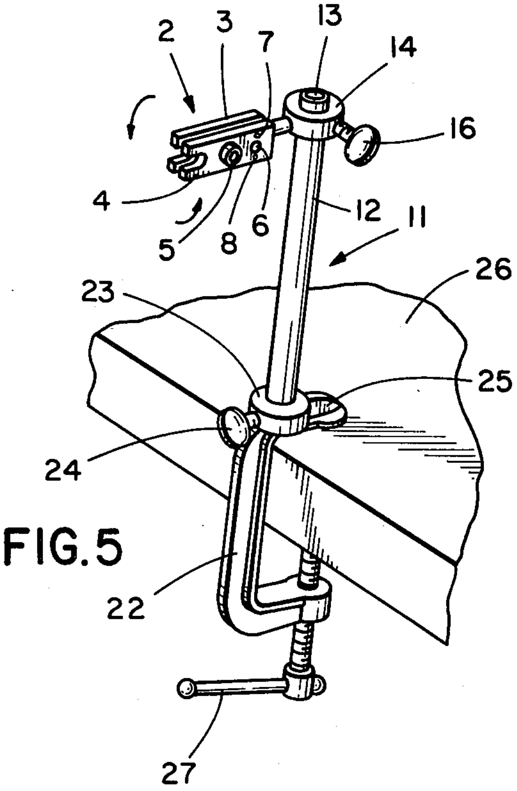
FIG. 5 is a perspective view which shows an alternative C-clamp bench side stand which cooperates with the holding jaws of FIGS. 1 through 4.

Referring now to the drawings, the embodiment of the invention shown in FIGS. 1 through 4 is adapted for holding a clock mechanism under repair on a bench top, and the embodiment shown in FIG. 5 is adapted for holding the clock mechanism on the side of a bench.

In FIGS. 1 through 4, clock mechanism 1 is held by a pair of jaws 2 which comprise a pair of parallel-disposed plates 3 and 4. Adjusting screws 5 and 6 couple plates 3 and 4 to one another. In particular, plate 3 is threaded to receive the threaded shaft of adjusting screw 5, and plate 4 is threaded to receive the threaded shaft of adjusting screw 6. Manual rotation of the heads of adjusting screws 5 and 6 effects an opening or closing parallel jaw movement of jaw plates 3 and 4.

A pair of threaded set screws 7 and 8 are housed in plate 4. These set screws may be manually rotated by a screwdriver so as to project into the holding gap defined between plates 3 and 4 to effect a minimum stop distance with respect to which distance the jaw plates cannot be further closed. This minimum stop distance effects a parallel minimum gap. Thus, a firm, parallel jaw hold is effected which is non-marring (or scratching) to the different plates or parts of a clock movement.

The U-shaped notches in jaw plates 3 and 4 enable the jaws to envelope obstructions presented by clock components, thus enabling the jaws to more firmly hold a clock mechanism under repair.

A support rod 9 projects from and is integrally formed with plate 3. This support rod holds the entire jaw structure 2 on bench top stand 10 (FIGS. 1–4), or alternatively on bench side stand 11 (FIG. 5).

Figure 2:
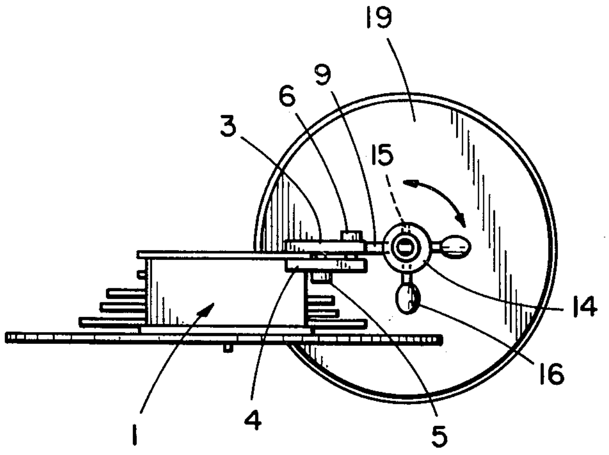
FIG. 2 is a plan view of the structure of FIG. 1.

Bench top stand 10 comprises an elongated shaft 12, the upper end of which is formed with a socket receiving hole 13 which is aligned with the longitudinal axis of shaft 12. A clamping collar 14 envelops the upper end of shaft 12. This clamping collar is fixed in the position shown in the drawings by a set screw 15 (FIG. 2). Clamping collar 14 and also the upper end of shaft 12 are formed with a pair of aligned holes (FIG. 3) so that jaw support rod 9 may be received within these holes which form a second socket for jaws 2.

Collar 14 carries thumb screw 16 which projects into hole 13. The manual tightening of thumb screw 16 fixes rod 9 relative the horizontal socket holes and shaft 12 as is shown in FIGS. 1 through 3.

In the event that a vertical positioning of jaws 2 is required for a proper holding of clock mechanism 1, thumb screw 16 is loosened and jaws 2 are removed from the horizontal socket holes contained within collar 14 and shaft 12; and support rod 9 may be inserted within socket hole 13 as is shown in FIG. 4 to effect a second positioning of jaws 2.

Figure 1:
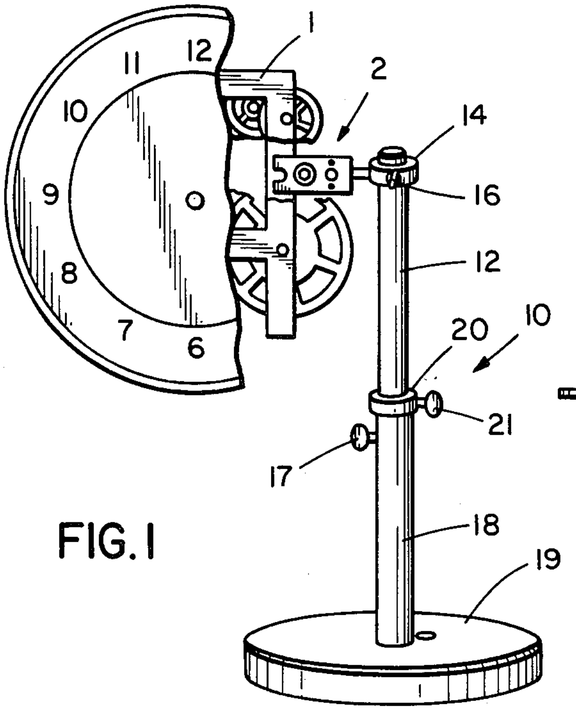
FIG. 1 is a perspective view of the bench holder of this invention with the clock-mechanism holding jaws being disposed in a first position and supported on a bench top stand.
Figure 3:
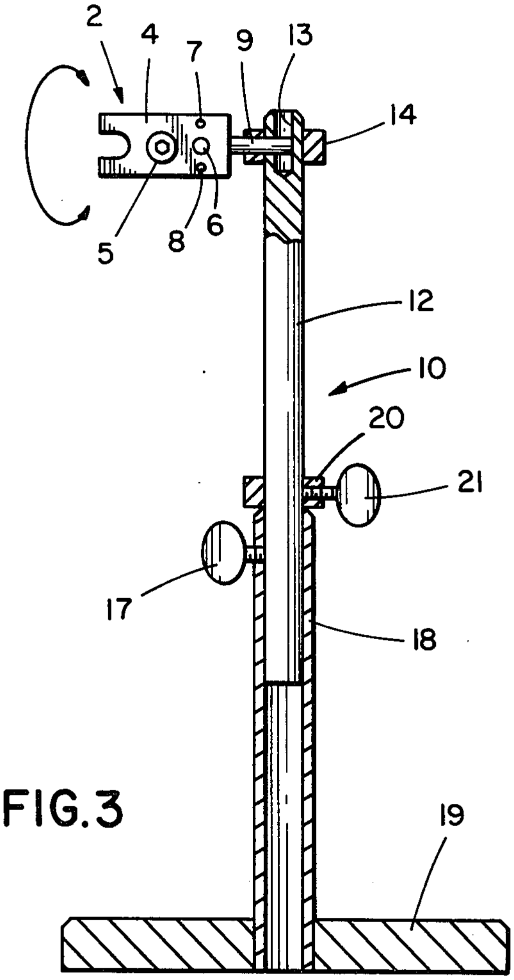
FIG. 3 is a side elevation view of the structure of FIGS. 1 and 2 with portions of the stand being broken-away and sectioned to show structural details.

It should be noted that in the position of jaws 2 shown in FIGS. 1 through 3, jaws 2 may be rotated in a complete 360 degree revolution both in a vertical plane and in a horizontal plane. In particular, the rotation in the vertical plane is accomplished by loosening set screw 16 and manually rotating jaws 2; and the rotation in the horizontal plane is accomplished by loosening height adjusting screw 17 and rotating shaft 12 within stand tube 18.

Bench top stand 10 comprises shaft 12 which is telescopically received within tube 18. Tube 18 is fixedly attached to support base 19.

A minimum-height, clamping collar 20 envelops shaft 12. The tightening of screw 21 against shaft 12 enables clamping collar 20 to serve as a telescopic limit for the insertion of shaft 12 within tube 18. The height at which jaws 2 are held is determined by height adjusting screw 17. When this screw is tightened against the adjacent side surface of shaft 12, shaft 12 is fixed relative tube 18.

Accordingly, the structure of FIGS. 1 through 4 represents a clock mechanism holder which has a bench top stand and which may support the adjustable parallel jaws 2 in a vertical or horizontal positioning of the jaws. In the horizontal positioning of the jaws (FIGS. 1–3), complete 360° rotational movement in either the horizontal or vertical planes may be obtained, as previously described. In the vertical positioning of the jaws (FIG. 4), complete 360° rotational movement in a horizontal plane may be obtained. Additionally, the jaws may be removed from the bench top stand 10 and the clock mechanism 1 separated from the stand as may be required.

In the embodiment of the invention shown in FIG. 5, jaws 2 as supported on shaft 12, is adapted for incorporation in a bench side stand 11. In bench side stand 11, a conventional C-clamp 22 is modified by welding a collar 23 carrying an adjusting screw 24 to the upper arm 25 of C-clamp 22. Collar 23 is formed with a central hole which is sized to engage fixedly shaft 12 when this shaft is manually inserted within the collar. The tightening of screw 24 enables bench side holder 11 to support rigidly jaws 2 on shaft 12 in a desired side position relative bench 26. Screw 24 also prevents rotation of shaft 12 relative to clamp 22. Thus, screw 17 (FIG. 3) and screw 24 (FIG. 5) perform essentially the same functions.

It should be noted that jaw structure 2 and shaft 12, as well as the clamping collar 14 in the embodiment of FIG. 5 is the same in construction as the identically numbered components in the embodiment of FIGS. 1 through 4. Accordingly, in the event that it is desired to support jaws 2 on stand 11 in lieu of stand 10, thumb screw 17 is loosened so as to enable shaft 12 to be withdrawn from tube 18. Thumb screw 21 may also be loosened and collar 20 removed from its enveloping engagement with respect to shaft 12, as the collar 20 performs no function in the embodiment of FIG. 5. Thereafter shaft 12 is inserted within the socket receiving hole formed in collar 23, and the resulting structure may be engaged in any portion of bench 26 that is desired. A tightening of clamp handle 27 fixes stand 11 relative bench 26 so that any supported clock mechanism may be worked upon.

It should be understood that the above arrangements are merely illustrative of the principles of this invention, and modifications can be made without departing from the scope of the invention.

I claim:

1. In a clock holder having an elongated clock support shaft, the improvement comprising a pair of parallel-disposed, clock-mechanism, platelike holding jaws, a jaw support rod rigidly fixed to one jaw and projecting therefrom, coupling means adjustably supporting the second jaw on the first jaw for a parallel opening and closing movement of the jaws and including a pair of screws with each screw housed within a different jaw to engage receiving threads formed in the opposite jaw, and means serving as a support stand and formed with one or more socket receiving holes to receive the jaw support rod and thereby position the jaws and any clock mechanism clamped thereby at a desired position.

2. The combination of claim 1 in which the platelike jaws are each formed with generally U-shaped recesses adapted to envelope clock components of clock mechanisms under repair, and one or more set screws housed within a jaw and projecting into the gap between the jaws to define a minimum spacing distance.

3. In a clock holder, the improvement comprising a pair of parallel-disposed, clock-mechanism, platelike holding jaws, a jaw support rod rigidly fixed to one jaw and projecting therefrom, coupling means adjustably supporting the second jaw on the first jaw for a parallel opening and closing movement of the jaws, a support stand having an elongated shaft formed with a first socket receiving hole in one end to receive the jaw support rod and thereby position the jaws and any clock mechanism clamped thereby at a desired position, a clamping collar adjustably fixed to the end of the shaft having the first socket holes on an axis normal to the longitudinal axis of the first socket hole whereby the jaws may be optionally inserted into either the socket hole in the shaft or the aligned socket holes and rotated within each of the socket holes to effect a desired attitude of a clamped clock mechanism.

4. The holder of claim 3 in which the support stand comprises a bench top base, a tube fixed to the base having an elongated central bore within which the shaft is inserted for telescopic movement, a second clamping collar enveloping the shaft and resting upon the tube to serve as a height adjusting stop, and a height adjusting screw supported by the tube and engaging the shaft to fix telescopically the shaft relative to the tube.

5. The holder of claim 3 in which the support stand comprises a bench attaching C-clamp having an upper extending arm, and a collar defining a socket fixed rigidly to the upper arm of the clamp to receive the shaft with the arm serving as a shaft stop to support thereby any clock mechanism under repair.

* * * * *